United States Patent
Berger et al.

(10) Patent No.: US 6,414,693 B1
(45) Date of Patent: Jul. 2, 2002

(54) SYSTEM AND METHOD FOR GENERATING COMPUTER DISPLAYS OF CUSTOM BAG DESIGNS

(75) Inventors: Robert E. Berger, Andover; Jonathan G. Isaacson, Lexington; Robert F. Leavitt, Boxford, all of MA (US)

(73) Assignee: The Gem Group, Inc., Lawrence, MA (US)

(*) Notice: Subject to any disclaimer, the term of this patent is extended or adjusted under 35 U.S.C. 154(b) by 0 days.

(21) Appl. No.: 09/417,152

(22) Filed: Oct. 12, 1999

(51) Int. Cl.[7] .............................................. G06T 11/80
(52) U.S. Cl. ............................ 345/641; 705/26; 705/27
(58) Field of Search ................................ 345/435, 629, 345/630, 631, 634, 635, 636, 637, 641; 705/23, 26, 27, 29

(56) References Cited

U.S. PATENT DOCUMENTS

| | | | |
|---|---|---|---|
| 5,880,740 A | 3/1999 | Halliday et al. | |
| 5,917,495 A | 6/1999 | Doi et al. | |
| 5,936,606 A | 8/1999 | Lie | |
| 5,999,191 A | 12/1999 | Frank et al. | |
| 6,014,146 A | 1/2000 | Freeman | |
| 6,144,388 A | 11/2000 | Bornstein | |
| 6,304,855 B1 | 10/2001 | Burke | |
| 6,344,853 B1 * | 2/2002 | Knight | 345/435 |

OTHER PUBLICATIONS

Carl Eric Wolrath, Secure Electronic Transaction, a market survey and a test implementation of SET technology [online], Sep. 27, 1998 [retrieved on Jun. 21, 2001]. Retrieved from the Internet: <URL>:http://www.wolrath.com/set.html.*

Lehman Communications Corporation, Today's Business [online], 1998 [Retrieved Jun. 21, 2001]. Retrieved from the Internet<URL>: http;//www.todaysbiz.com/897/notebook.html.*

* cited by examiner

Primary Examiner—Jeffery Brier
Assistant Examiner—G. F. Cunningham
(74) Attorney, Agent, or Firm—Cesari and McKenna, LLP; William A. Loginov, Esq.

(57) ABSTRACT

A system and method for customizing articles on a computer-based display provides a supplier database and remote client computer. Data is transferred between the supplier and the client computer including predetermined images of client articles and accompanying images of custom graphics. The database stores information on a variety of clients. Each client is associated with one or more profile, and each profile includes a series of images associated therewith. The client logs in under a given profile user name and password, and selects desired article images, and then calls up associated graphic images to manipulate onto the article images, creating a desired appearance. This appearance can be resubmitted to the supplier for production of an actual physical sample of the article.

18 Claims, 9 Drawing Sheets

SYSTEM AND METHOD FOR GENERATING COMPUTER DISPLAYS OF CUSTOM BAG DESIGNS

FIELD OF INVENTION

This invention relates to network-based computer systems, and more particularly systems and methods for the designing and ordering of custom products in an Internet-based, or other computerized environment.

BACKGROUND OF THE INVENTION

Bags, portfolios and other items having customized names, logos and other promotional graphics thereon have been available for many years. The process of producing these personalized items typically involves the design of a custom logo, or other graphic design, which is subsequently provided to a specialized manufacturer for application to a pre-existing article (often a bag, portfolio, tote, luggage piece or other item). The graphic can be produced as a sew-on textile patch, a screen-printed design, an adhesive decal or another form of applique. The process of designing and applying a customized graphic to an underlying article is largely labor-intensive and can entail significant costs. Accordingly, several samples of the article, usually bearing differently sized and variably positioned graphics thereon, are initially produced for review by the customer. The customer typically selects one or more of the samples from which a larger production run of customized article(s) occurs. A discriminating large-capacity customer may require several runs of samples before a finalized design is chosen. As noted, substantial labor is required in creating these many samples, and a substantial time period often elapses, before the final production run occurs.

The recent popularity in Internet-based commerce (often popularly termed "e-commerce") has afforded the purchaser greater opportunities to select and commission custom and semi-custom products from a large range of suppliers using a remote computer. Computerized orders are received at the supplier via the Internet after logging into a manufacturer's or distributor's site on the well-known World Wide Web (e.g. its "web site"). Once received by a system administrator or dedicated staff member, these computer-based orders are converted into a confirmed order for a given product at the supplier's facility.

In general, current Internet-based product-ordering services enable the selection of ready-made products from a catalog list. Some sites allow rudimentary customization by providing various menus of alterations or additions to an underlying article. Typically, the modifications are selected from a specific list of preexisting modifications (hence, "semi-custom" goods). These semi-custom products can sometimes be viewed based upon pre-loaded images—though the pictorial accuracy of the customized images, when compared with the actual finished article, is not always guaranteed.

It is, therefore, an object of this invention to provide a system and method for enabling the custom design and ordering of large number of articles in an Internet or other computer-based environment. These articles should allow an ordering client to be able to manipulate and view the finished article with a reasonably good degree of accuracy and clarity.

SUMMARY OF THE INVENTION

This invention overcomes the disadvantages of the prior art by providing a system and method for customizing the appearance of base articles on a computer-based display using a variety of graphic images, so that the user can preview an article before commissioning an order. Data is transferred between a supplier having a server that manages a local database and a remote client computer. The data stored on the database typically includes predetermined images of client articles and accompanying images of custom graphics. These graphics are created by the supplier based upon designs typically submitted by the client or a related end user. The database stores information on a variety of clients. Each client is associated with one or more profile, and each profile includes a series of images associated therewith. The profiles may each be a particular end user associated with a client who is a distributor of articles. The client or an underlying end user logs in under a given profile user name and password, and selects desired article images, and then calls up associated graphic images for an image file in the database that is associated with the profile. The graphic images appear at the client display in menu form, and are selectively manipulated onto a preselected article image, creating a desired appearance. Manipulation of the graphics onto the article image can be accomplished by a drag and drop process using a conventional computer mouse operating on a conventional operating system software application. The customized article appearance can be resubmitted to the supplier for production of an actual physical sample of the article. In one embodiment the articles are bags, luggage, totes, portfolios and the like, while the graphics are logos, trade names, pictographs, etc.

BRIEF DESCRIPTION OF THE DRAWINGS

The foregoing and other objects and advantages of the invention will become more clear with reference to the following detailed description as illustrated by the drawings in which.

DETAILED DESCRIPTION OF AN ILLUSTRATIVE EMBODIMENT

Figure 1:
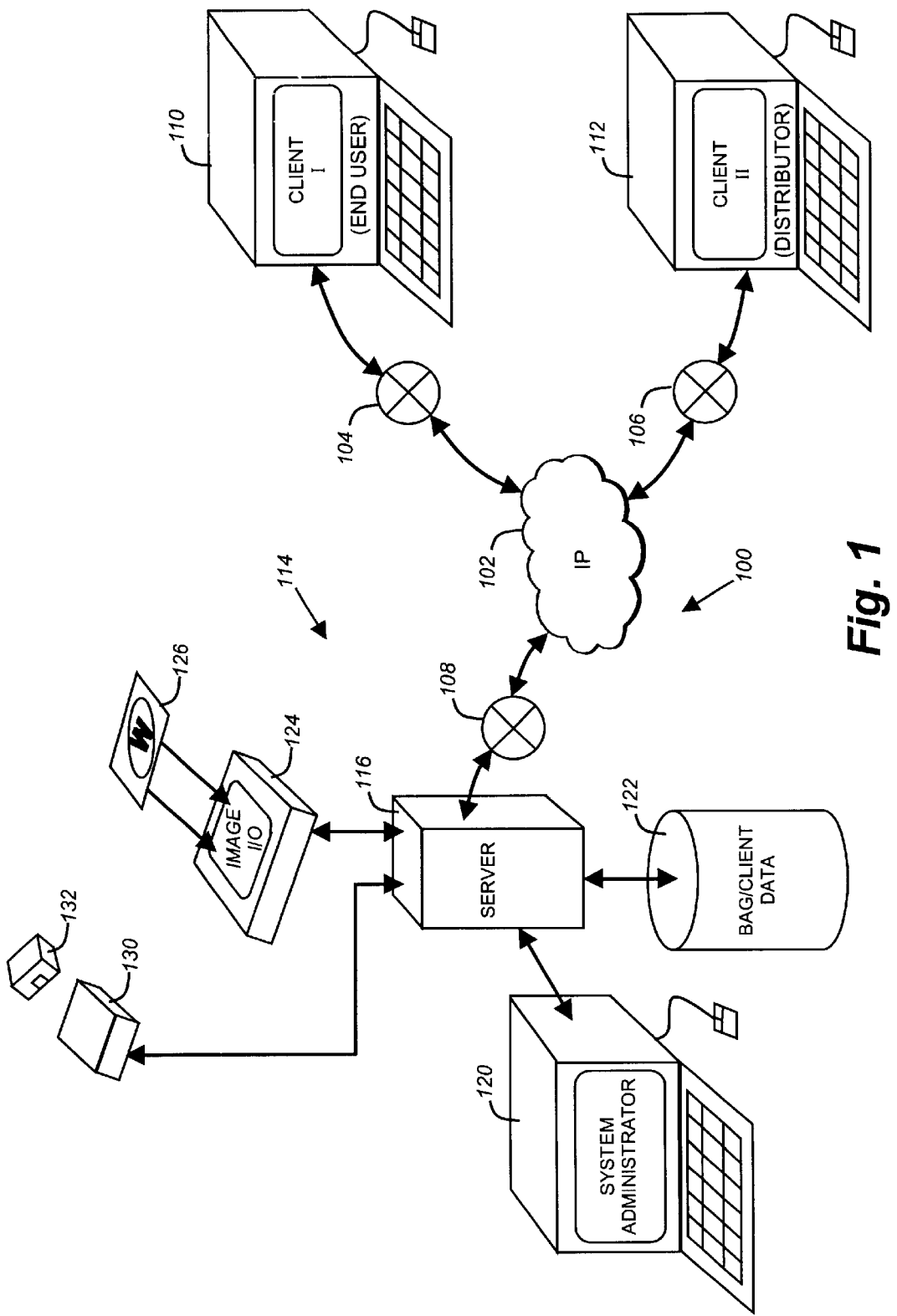
FIG. 1 is a block diagram of an Internet-based communication system for use by the service operator and associated clients thereof according to this invention.

FIG. 1 details a simplified arrangement for an Internet-based network for use by the system and method of this invention. The network 100 enables communication by various computing devices through an Internet Protocol (IP) network layer shown generally as the cloud 102. A plurality of routers 104, 106 and 108 are shown interconnected to the cloud 102. These routers enable IP-layer address packets of digital information to pass from a source to a destination via the cloud 102. The principles governing these functionalities are well known.

A pair of exemplary clients, Client I 110 and Client II 112 are shown. These clients each generally define microcomputers having a display, a keyboard for entry of alphanumeric data, and a mouse for graphical-user-interface data manipulation. In practice, hundreds or thousands of clients may exist. Two clients are shown for the purposes of this example. These clients can comprise end users, distributors or other specialists. For the purposes of this example, Client I 110 is an end user and Client II 112 is a distributor of customized articles (herein broadly defined as bags, totes, portfolios, and the like). Also for the purposes of this description, an end user is considered a group or individual that purchases and uses articles having desired custom graphics (logos, word marks, pictographs, etc.) applied thereto. Likewise, distributors are groups or individuals that "distribute" customized articles to end-users. In general, distributors are used to effect all purchases from the supplier (e.g. the service provider herein). It is contemplated that the end user shall have access to the supplier's system 114, but that purchases must be made via the distributor. Of course, variations on this arrangement, in which certain end users can purchase directly from the system, are also contemplated.

The system 114 comprises a server 116 that can be any acceptable microcomputer, minicomputer or mainframe according to this invention. In general, a microprocessor-based microcomputer with advance file-serving capabilities is contemplated. The server is programmed and controlled by a system administrator 120 that can comprise a separate microcomputer or dedicated terminal. The system administrator 120 is joined to the server by a local area network (LAN) of conventional design. Also, networked to the server is a storage medium 122, typically in the form of a disk drive or drives. As is described further below, this storage medium (disk) 122 stores data relating to clients, bags and graphics for application to the bags. Other data relating to customers/clients and related matters can also be stored therein. In addition, the server interconnects to a scanner 124, or other input/output peripheral, for inputting an image of a drawn graphic 126 as is data into the system 114. This drawing can be prepared by the client, or by the supplier, as described further below. Alternatively, an external disk drive 130 can be used to read graphic image data stored on a floppy disk 132. Such data may originate with the client, based upon it's own computer aided design work to produce graphic images. Likewise, a CDROM reader (not shown) can be substituted for the disk drive 130. Other data-input devices including a graphics computer aided design (CAD) package, operated as part of the supplier's system, can be linked to the server, and used to input image data. Such a program can be operated by the system administrator 120 or by another terminal/computer linked to the server 116.

Figure 2:
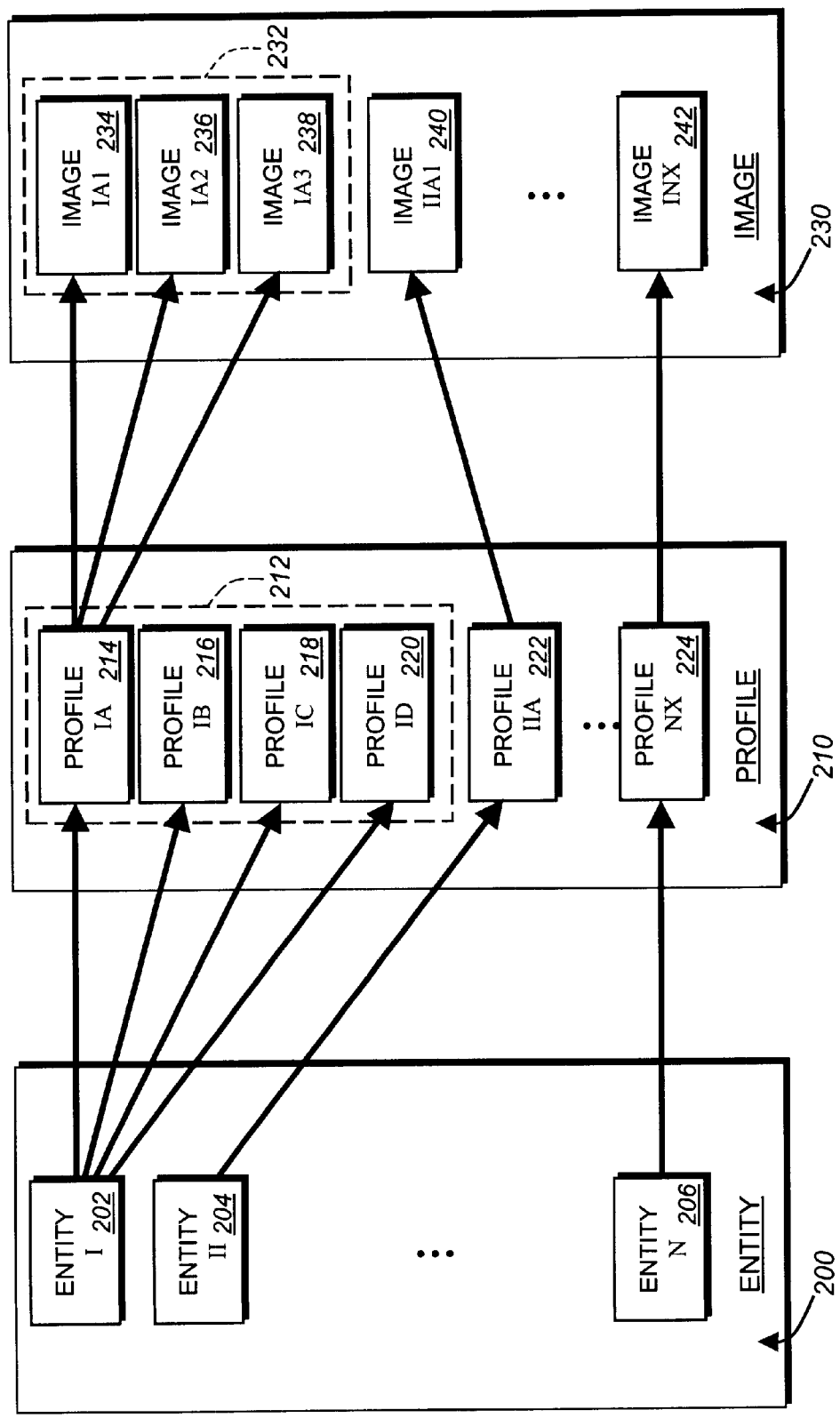
FIG. 2 is a block diagram schematically detailing a relational database as used in conjunction with the system and method of this invention.

With reference to FIG. 2, the organization of a database controlled by the server 116 is now described. This database is typically implemented in the server based upon the well-known Windows® NT operating system, using a conventional software package such as SQLServer 7.0 both available from Microsoft Corporation of Redmond, Wash. Other commercially available operating systems and databases can be substituted in the server according to alternate embodiments.

In general, the database is organized so that each unique user of the service is defined as an "entity" 200. Each entity 200, 204 and 206 is considered either a distributor or an end user. Each entity has a unique account number that is stored in connection with the entity in the database.

For each entity there is contained one or more associated profiles 210. For example for Entity I 202 there is a profile block 212 consisting of Profile IA, Profile IB, Profile IC and Profile ID 214, 216, 218 and 220, respectively. Likewise Entity II 204 has associated profiles 222 and Entity N has associated profiles 224. Each entity is assigned at least one profile by default. Each profile has a unique user name and password associated therewith. In the case of a distributor, each profile may consist of an individual customer (end user) desiring articles having customized graphics. Accordingly, the end user's name may comprise the user name and a unique password is associated with the user name to limit access. Each profile, accordingly, has associated therewith one or more image files 230. For example the image block 232 includes Image IA1, Image IA2 and Image IA3 234, 236 and 238, respectively. These images are each associated particularly with profile IA 214 in the database. Each image includes data for a particular graphic from an overall menu created to serve the particular end user. As noted above, basic graphic designs are provided by either the end user, distributor or by the art department of the supplier. The nature and content of the graphic images is described further below. Likewise, Profile IA2 has associated images 240 while profile NX 224 has associated images 242.

The use of the system according to this invention is now further described. Reference will be made throughout to steps occurring in the flow diagram 300 of FIG. 3. First the client contacts the supplier's web address (step 302) to access the supplier web site's basic log-in screen (step 304) presented to a client after contacting the supplier's web site. The functionalities of the web site can be provided as a Hypertext Markup Language (HTML) application or a Java-based application (the Java operating system/language being available from Sun Microsystems Corporation). In a preferred embodiment, the web site is provided as one or more Java "applets" for operation with a Java-compatible web browser on the client's local computer.

Figure 3:
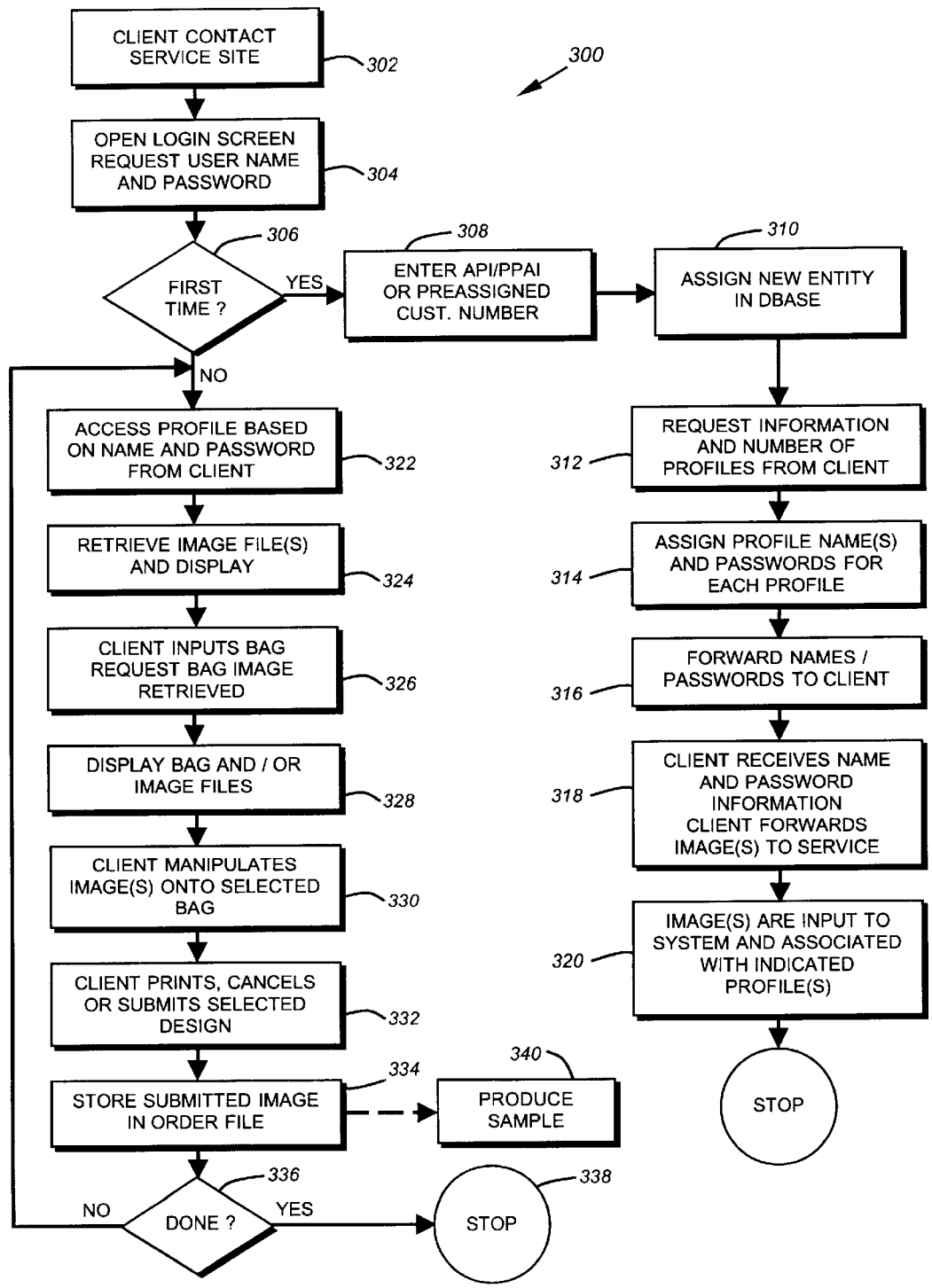
FIG. 3 is a flow diagram describing basic interaction between the service operator and client's thereof according to a preferred embodiment of this invention.
Figure 4:
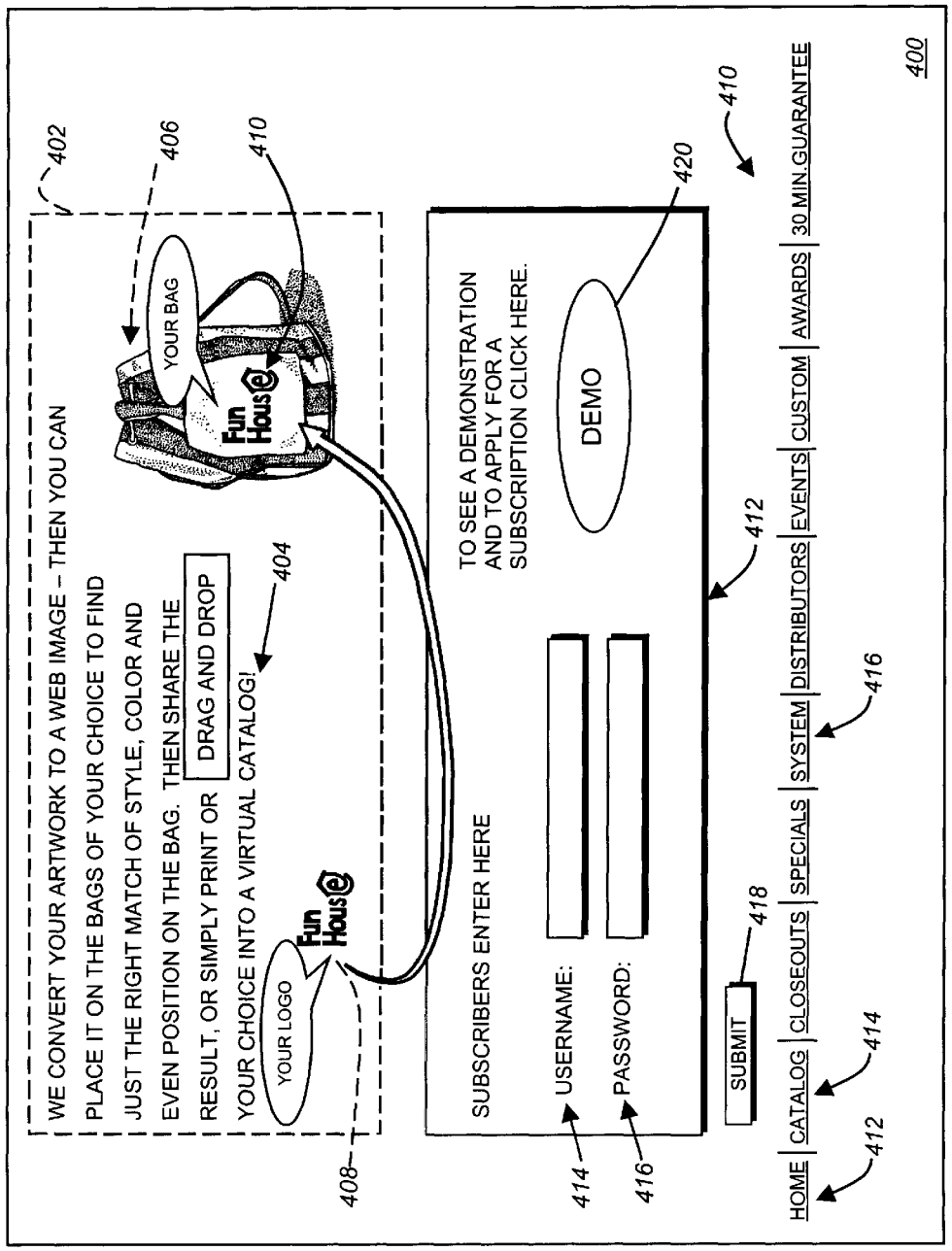
FIG. 4 is a diagram of a screen display for initial log-in according to this invention.

The screen display 400 shown in FIG. 4 is an initial log-in window upon accessing the web site at a client computer (FIG. 3, step 304). In this example an upper window 402 displays instruction text 404 an example of the function of this system illustrating an exemplary system operator bag 406 as available from a general catalog produced by the system operator. In addition a graphic 408 is illustrated showing its movement onto a predetermined location 410 on the bag 406. Beneath the exemplary window 402 is a log-in block 412. The block 412 in this embodiment includes entry locations for typing a user name 414 and password 416 which can be submitted by clicking the submit button 418. The entry of data herein can be accomplished using a keyboard and/or mouse of conventional design. As described above, the user name and password relates to particular profiles within the database these profiles in turn, are part of an overall entity that has been assigned to a given client. Where a new client is logged-in in for the first time (FIG. 3, decision step 306), the demonstration button 420 can be activated.

Figure 5:
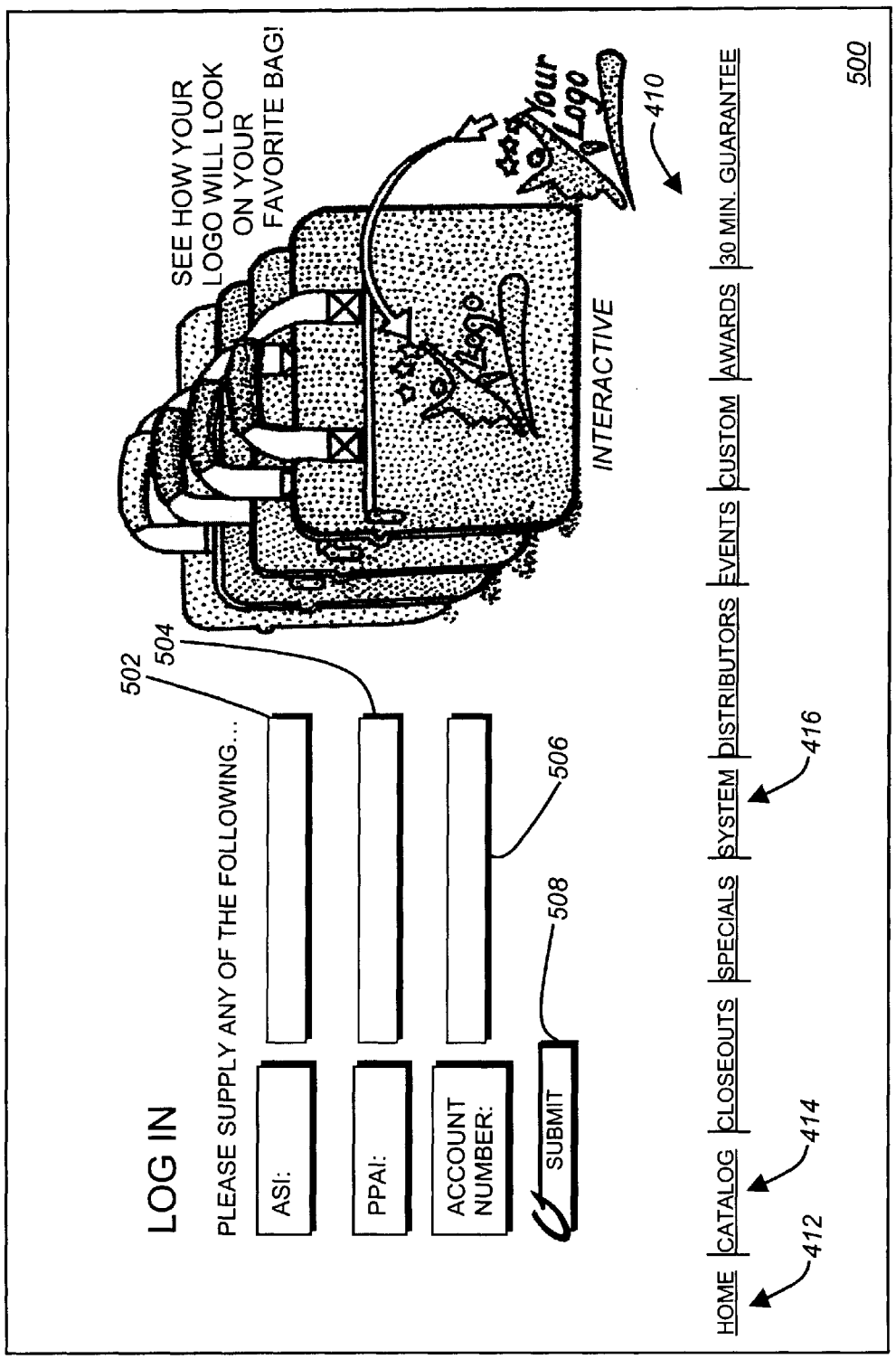
FIG. 5 is a diagram of a screen display for a new client log-in according to this invention.

The demonstration button produces the screen 500 shown in FIG. 5. The client is prompted to provide information in any of three blocks 502, 504 or 506 and then submit this information using the button 508 (FIG. 3, step 308). The button 502 enables the entry of a "Advertising Specialty Institute" (ASI) number. This number is assigned by that trade group to organizations and individuals ("entities") involved in advertising and marketing for profit who are members of the group.

The second block 504 requests a Promotional Products Association International (PPAI) number this is a trade group specifically serving organizations and individuals in the non-profit promotional area. As a default, the block 506 allows the entry of a preassigned account number given to the client by the service operator. Input of a given number instructs the database to create an appropriate entity therein (FIG. 3, step 310). It should be noted that these numbers are specific to the exemplary industry described herein and that other forms of account number information, or a more simplified account number system can be substituted according to an alternate embodiment. A new number, not previously entered in the system, causes a request for information to be produced and downloaded to an e-mail site or mail address of the client. The client is prompted to give appropriate information, which is then processed. Billing information and other statistics relating to the client are stored to create a basic entity assignment in the database. An account number is given to the client by return e-mail or mail and thenceforth, this number is used to identify a particular client. In addition, the system requests that the client enter the number of profiles that it initially wishes to have assigned to it (FIG. 3, step 312).

The system/system administrator assigns arbitrary user names and passwords for each profile selected (FIG. 3, step 314). These are typically so that they do not conflict with other user names and profiles. In most instances, user names can be prerequested by the client during log-in process. In one embodiment an additional dialog box (not shown), asking for proposed user names and proposed passwords for each requested profiles, can be requested during log-in process. User names and passwords for each profile are returned to the client by return e-mail, a reply web page, or other return mail processes (FIG. 3, step 316).

Once each user name and its associated password is received from the service provider/supplier by the client, the client can enter these data points into the appropriate is blocks 414 and 416 in the screen 400 of FIG. 4. Note that a series of links can be displayed on the screen 400. The links 410, omitted in later views for clarity, can appear on every screen shown herein. Significantly, these links, among others, allow the client to jump to the home page ("Home" 412) the on-line catalog ("Catalog" 514) and into and out of the specification system ("System" 416) of this invention. In particular, by clicking on a link, a screen having the relevant information is opened on the client's computer. These links operate according to well-known functionalities.

Once user names and passwords are received, the client typically forwards graphic artwork or requests for creation of artwork to the supplier (FIG. 3, step 318). This artwork is the basis for image data to be supplied to the supplier system. The image data is entered into the system by graphical scanning (and digitizing), reading of computer files and or receipt of data over a modem/network connection (FIG. 3, step 320). In general the image data is manipulated by the supplier to create a number of image files to be assigned to a given profile. The nature and type of files is described further below. Generally such files are formatted as well-known Graphics Interchange Format (GIF) (generally identified as ".gif") graphical image files for storage in the database. However use of a variety of graphical file-storage formats are expressly contemplated. A GIF file is chosen because it enable active animation of the image, whereby the boundaries of the image on a background are delimited by the image itself without an external border. In general, GIF files are loaded into a cache directly on the client's computer once they are retrieved from the supplier web site.

By creating entities and associated profiles it is possible to control access to the site so that distributors can maintain final authority over orders. In particular, a distributor can provide its customers (e.g. end users) with a given user name and password that relate to that end user's "profile" associated with the distributor "entity." Hence the distributor is associated with a transaction even if it is undertaken directly by an end user. Similarly, if an end user contacts the site directly for the first time, the system administrator or an automated function can request the name of that end user's distributor and assign it if known. A preexisting profile is then assigned to the end user based upon the known distributor "entity." Alternatively, the system can provide a list of distributors from which the new end user can select. The profile then becomes associated with that distributor "entity." The distributor and end user are each provided with the new profile/user name by return e-mail.

Figure 6:
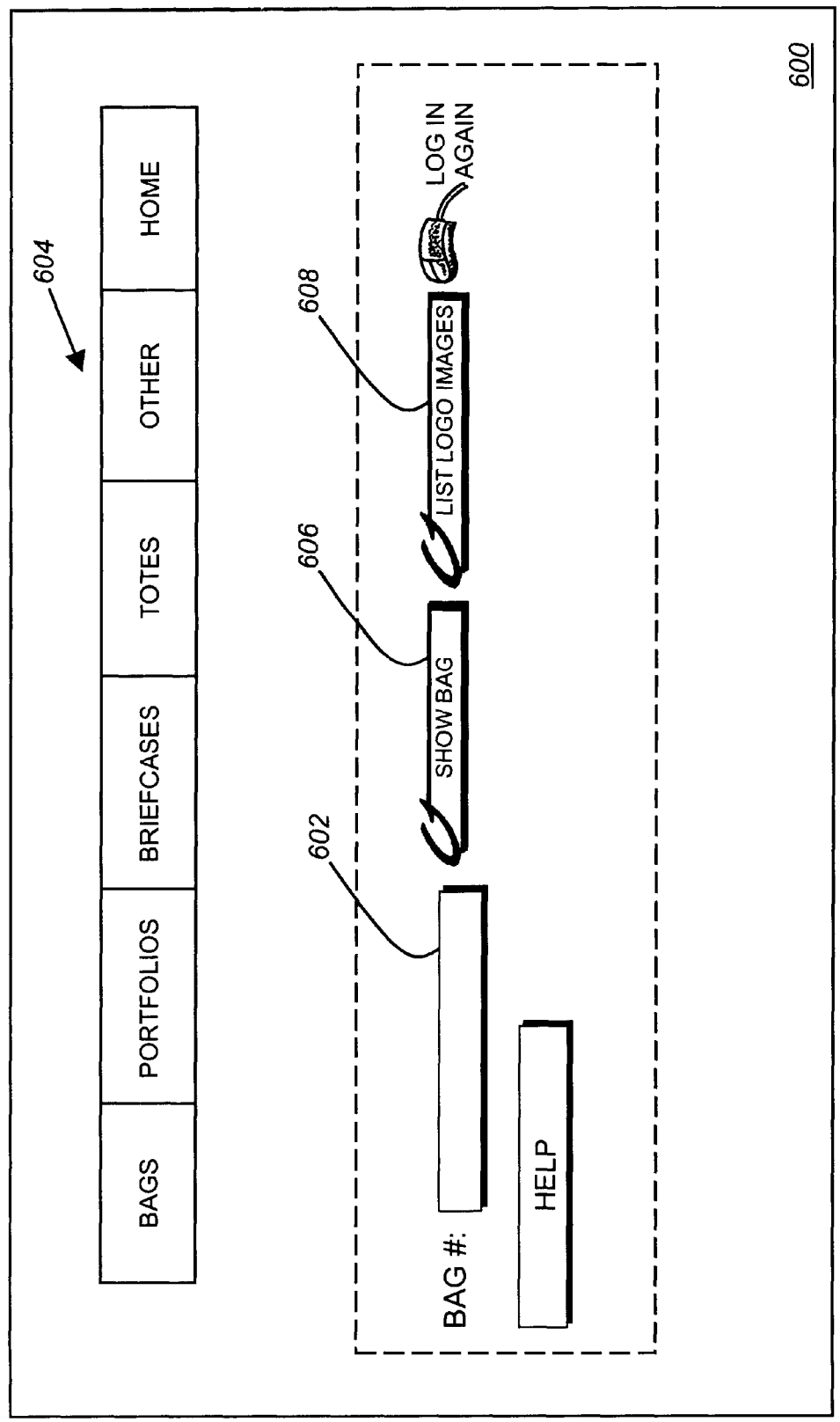
FIG. 6 is a diagram of a screen display demonstrating an example of the process of customizing an article by applying a graphic from a corresponding list of pre-defined graphic images according to this invention.

Once a known entity identifies itself by submitting the user name 414 and password 416 in FIG. 4, the screen display 600 of FIG. 6 is displayed on the client's computer screen (FIG. 3, step 304 and decision step 306). This display appears for both demonstration and active-use modes. For the purposes of this description, the active-use mode and the demonstration mode are identical in function. In practice, the active-use mode allows the actual creation of example articles using the information stored in the entity, profile and image database, while the demonstration mode uses a predetermined set of information that emulates an actual session. Articles that are created according to an active-use session can be ordered as such from the supplier. Demonstration articles typically cannot be ordered from the system operator. During active-use, the system retrieves data related to an entered user name and password (e.g. the profile) for a given identified entity (FIG. 3, steps 322 and 324).

With reference to FIG. 6, the display screen 600, in active-use mode, once the profile is identified, prompts the client for the number of an article (bag, etc.) to be customized, and the appropriate identifier is entered by the client (FIG. 3, step 326). A screen block 602 for entry of an identifier (bag number) from an underlying catalog is provided. The client may locate an identifier (bag number) by consulting the on-line catalog, accessed by consulting the catalog link on the screen (described above). In an alternate embodiment, the article/bag can be readily displayed, and flagged/copied for automatic entry into the block 602 by accessing an image of the article, via a menu 604 located directly on the screen 600.

Figure 7:
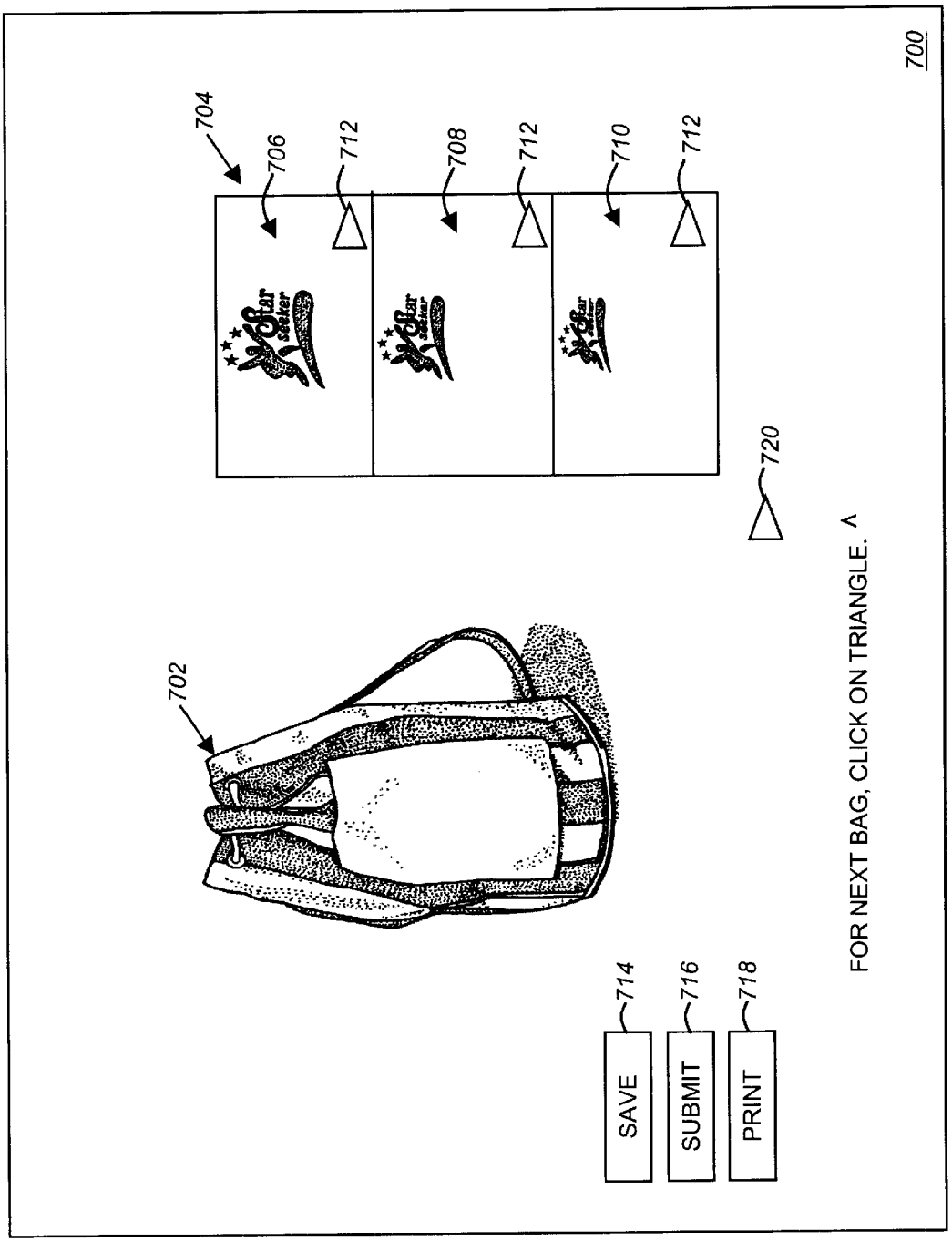
FIG. 7 is a diagram of a screen display detailing the first step in the customization of an exemplary bag according to this invention showing a client-selected bag and predetermined client graphic menu.
Figure 8:
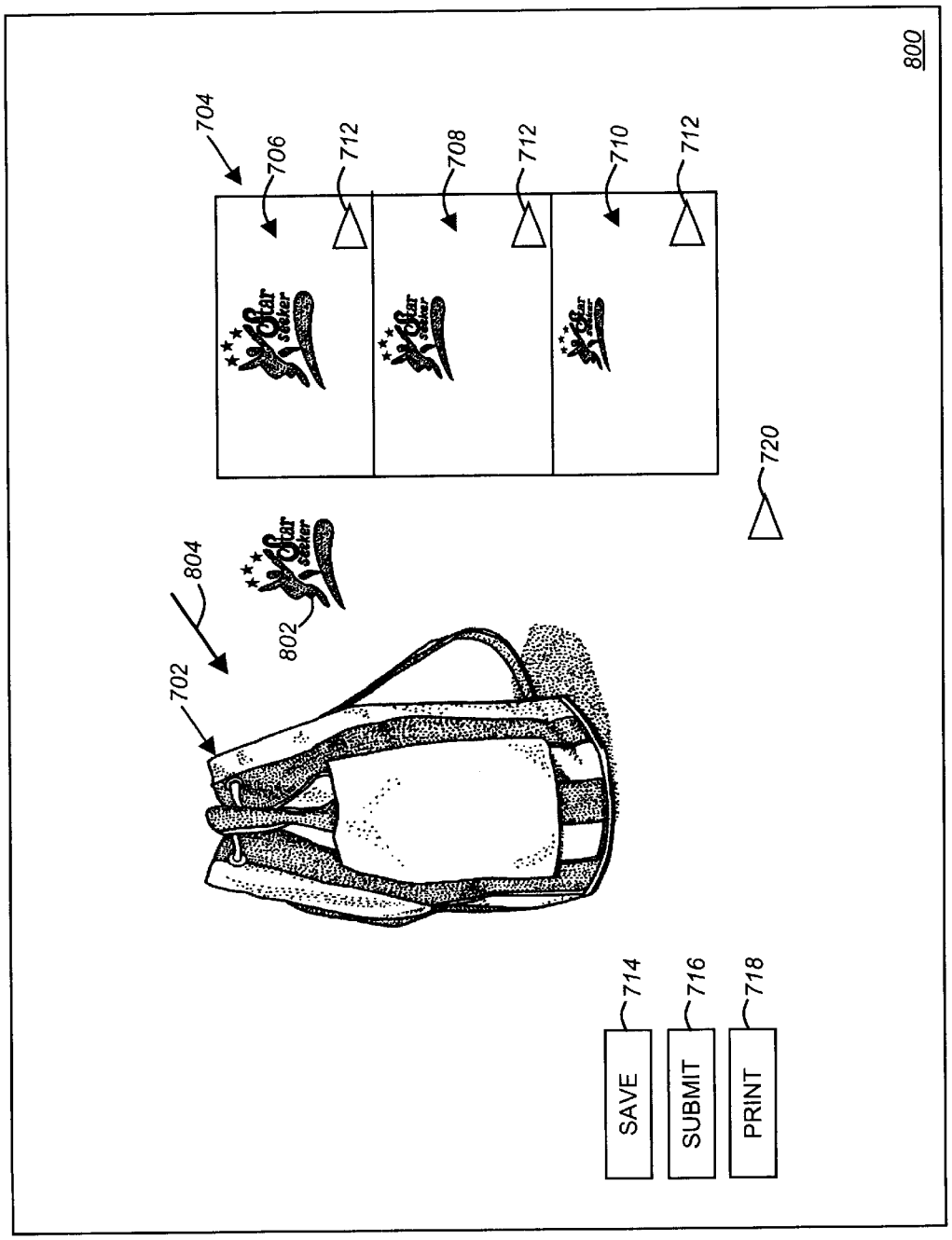
FIG. 8 is a diagram of a screen display detailing the next step in the bag customization process in which a client's graphic selected from a predetermined menu thereof is moved into position.

The screen 600 includes buttons that enable the selected article/bag to be shown (button 606) and for the stored graphics (button 608) to be listed in graphical form. By clicking both buttons 606 and 608, the screen display 700 of FIG. 7 is generated (FIG. 3, step 328). The screen display 700 shows and exemplary bag 702 in a bag display field. This field is formatted to enable a pictorial image of a selected bag to appear. In general, bag images are stored as a series of Joint Photographic Expert Group (JPEG) formatted computer graphic files (identified by ".jpg") in a bag file in the database. The images are initially created by the supplier from digital/digitized photos of actual article/bags that are manipulated to create appropriately scaled and shaded images for display on the web site screen. A conventional software package such as PhotoShop® available for Adobe can be used to input, manipulate and store images in JPEG format, which entails the compression of a large image data file into a smaller compressed file without appreciable loss of clarity. Other graphic formats, such as Bitmap, can be substituted for storage of article/bag images. The client computer should have hardware and software (like a commonly available video capture board) to enable translation and viewing of a JPEG-format file. During entry of these images into the database, they are generally centered within their respective fields' of view (the perimeters of the "photo") based upon the outer perimeters of the image view field. In general, the system operator sizes the image so that it remains within certain predetermined boundaries. Thus, larger bags and smaller bags are generally formatted so that they are all of approximately similar size within the window. To the right of the window appears a menu 704 of graphic images from the profile's image database. In the illustrated example, a series of three identical images 706, 708 and 710 are arranged vertically within the menu 704. These images differ in their relative size. Scaling is a function generally undertaken by the system operator based upon one or more original images provided by the client. The menu 704 can consist of a variety of sizes, color combinations or underlying types of images. Each block containing an image also includes an arrow 712 according to this embodiment. These arrows allow other images within the overall group of image files for the associated profile to be accessed. It is contemplated that a larger or smaller number of images can be displayed on a screen 700 at a given time each of the images stored within a given block is, again, a GIF formatted image. The GIF format is used because it enables the associated image to be dragged and dropped without an outlining boundary therearound this will become more clear when viewing the following figures. Screen display 700 also reveals a series of buttons 714, 716 and 718 that include but are not limited to a Save, Submit and Print button, respectively. In addition, the screen includes an arrow 720 that enables selection of another bag within a given profile. These buttons and their underlying functionality's can be varied to enhance the convenience of the user in a variety of ways. Referring now to FIG. 8, a screen display 800 is shown. The display 800, in particular, details the movement by a conventional mouse-driven drag and drop process of a selected graphic 802 toward the bag 702 (see arrow 804) any of the above-described graphics in the menu can be so dragged and dropped according to this invention. It is contemplated that a direct movement of the graphic 802 into the field of the bag can be accomplished rather than a physical drag and drop in which the graphic can "stop" in mid stream there between. In any case, the graphic should be movable to within a predetermined field around the bag.

Figure 9:
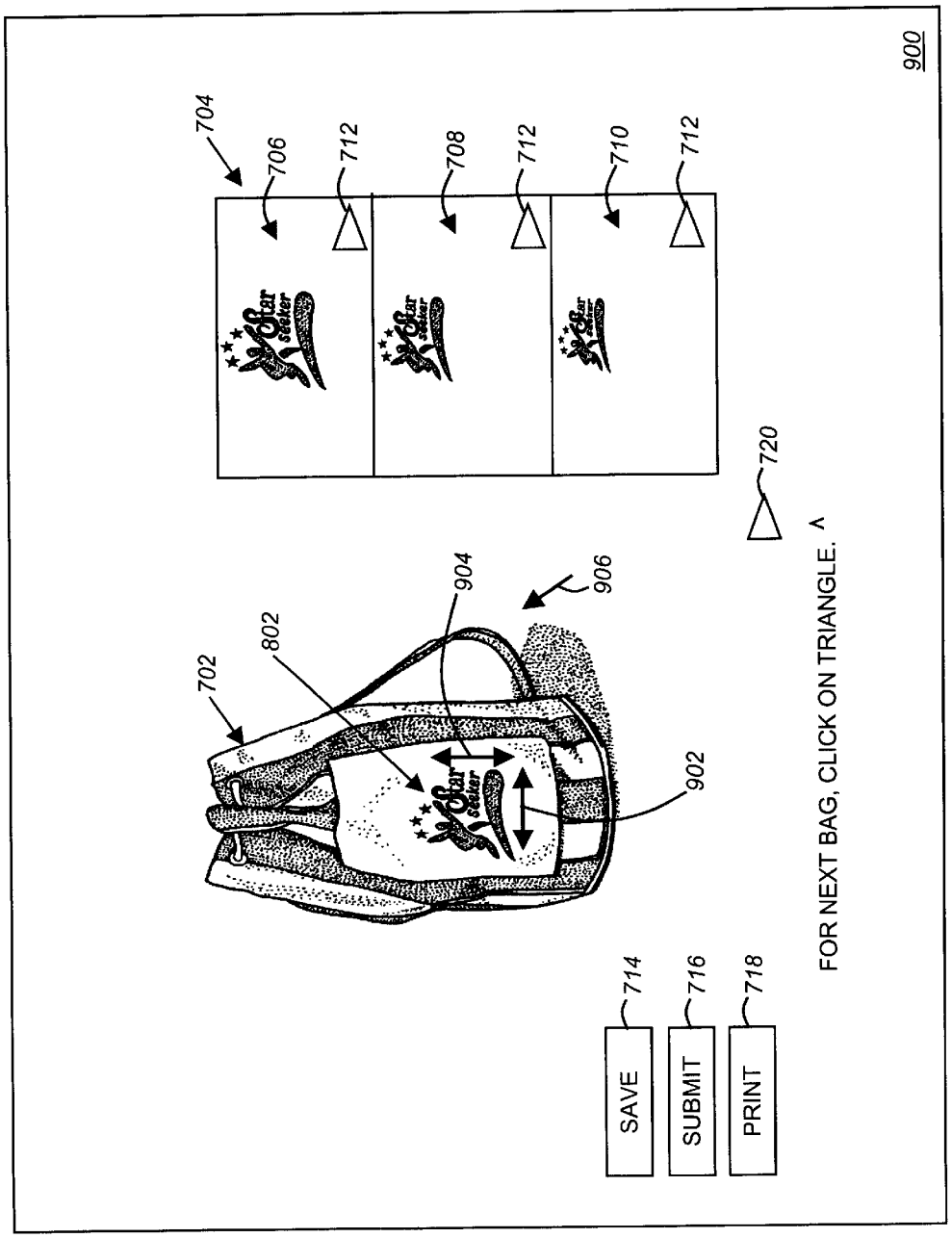
FIG. 9 is a diagram of a screen display detailing the final step in the bag customization process in which the graphic is positioned on a bag.

Finally, FIG. 9 shows a screen display 900 in which the graphic 802 has been positioned within the relative center of the bag 702. At this location the graphic 802 can be freely manipulated (FIG. 3, step 330) within the bag image by a drag and drop process horizontally (double arrow 902) and vertically (double arrow 904). In general, such drag and drop action is accomplished by locating a mouse-controlled cursor (shown as an arrow 906), on the graphic and depressing the left or right click button on the mouse. While depressing the button, the mouse is moved to simultaneously move the graphic at a desired position on the bag. Once the desired position is attained, the button on the mouse is released, allowing the graphic to remain in the desired location on the bag.

Graphics can be manipulated about the bag in turn until the desired appearance is attained. Once the desired appearance is finalized, the finished bag can be saved for later use by pushing the save button 714 saving the bag takes a combination of the GIF file data of the image in its relative location within the window of the JPEG file of the bag and stores these either within the user's own computer. In addition, the finalized design can be printed by clicking the print button 718. A print command causes appropriate application software within the users computer to send the screen image to a dedicated printer. Finally, the image can be submitted for production by clicking the submit button. See, generally, FIG. 3, step 332. When the customized bag image is submitted to the supplier, the selected GIF file, in its finalized location within the JPEG bag image file are downloaded to the supplier/system operator for storage in an order database (FIG. 3, step 334). The coordinate location of the GIF file with respect to the bag image is stored so as to maintain its relative location on the bag when reviewed by the supplier's production department out of the order database. This order database can include profile data as well as entity data so that the order can be associated with a given client. If the client is an end user, this process triggers an inquiry to the end users associated distributor. The distributor typically approves the order and handles all financial aspects thereof. In the case of a distributor placing an order, financial arrangements and other details are confirmed by return e-mail or a reply web page. Once the customization of a bag is completed, the client is prompted if another bag customization is desired. If so, then the decision block 336 (FIG. 3) requests a new profile. Otherwise, the session is completed (stop step 338 in FIG. 3).

It should be clear from the above description that the system of this invention enables end users to view completed bags with desired graphics thereon quickly, easily and in a large number of variations. This process assists end users in coming to a final determination on a customized design as it shows the finished article in a relatively accurate way. While the system may not replace the actual production of samples, it eliminates "mistakes" that would not have been made if more information were available to the end user on the possible appearance of finished products. Optional step 340 in FIG. 3 indicates the possibility of producing an article/bag (sample or production run) directly from the order step. Additional instruction dialog boxes (not shown) can appear, according to an alternate embodiment, following a submission of a custom design by the client to provide more-specific instructions for producing an actual, physical version of the article. In addition, it is expressly contemplated that further conveniences can be provided to the system. For example, an automatic scaling function can be incorporated into the menu that enables graphics to be variably sized on demand. In addition, applications that allow certain portions of the graphic to be in-filled with alternate colors can also be employed. Such in-filling can be applied to the underlying bags as well. A variety of dialog boxes can be provided to facilitate on-line ordering of submitted bags according to current, widely employed principles of e-commerce.

As such the foregoing has been a detailed description of a preferred embodiment. Various modifications and additions can be made without departing from the spirit and scope of this invention. The principles described herein, while shown in the area of bags, totes, and alike, can be applied to a variety of commercial products in which customization is desired. In addition, while the implementation of a network herein involves the electronic interconnection of a client and supplier system, it is contemplated that software and data packaged in disk or other form can be physically exchanged between the supplier and client to undertake the customization processes described herein. For example, database data relative to a particular entity or profile can be transferred to the client, and a customized article, completed using the operating software and client data can be transferred in disk, pictorial, or other form back to the supplier. The "database" can be one or more individual databases that are generally linked by appropriate network/server connections, or similarly arranged in a distributed manner. A "network" as used herein should be taken broadly to include such physical transfer of information, data and operating software between supplier and client. Finally, while the graphic designs are typically customized, supplied by the client or supplier to order, the graphics can also include various standard designs stored in the database, and accessed by appropriate dialog boxes. Accordingly, this description is meant to be taken only by way of example and not to otherwise limit the scope of the invention.

What is claimed is:

1. A system for enabling customization to viewed articles available from a supplier on a client display screen located remote from the supplier at a client, comprising:

a storage medium at the supplier having a database including at least one profile of the client, the profile including a plurality of graphic images having different characteristics associated with the client;

a plurality of images, stored by the supplier, representative of articles associated with the supplier;

means for displaying, at the client, an article image from one of the plurality of images representative of articles and a menu that includes the plurality of graphic images associated with the client; and means for enabling the client to manipulate a selected graphic image of the plurality of graphic images to a predetermined location that is overlaid on the article image and for fixing the selected graphic image associated with the client at a predetermined location on the article image, wherein the selected graphic image overlaid over the article image is substantially free of boundaries so that areas not defined by the selected graphic image appear as a portion of the article image lying thereunder.

2. The system as set forth in claim 1 further comprising a computer network interconnecting a respective computer of each of the client and the supplier, the computer network being constructed and arranged to transmit data electronically between the supplier and the client display screen.

3. The system as set forth in claim 2 further comprising means for transmitting a combination of the selected graphic image and the article image in a predetermined orientation to the supplier computer over the network from the client computer and for storing the selected graphic image at the supplier computer for further processing.

4. The system as set forth in claim 3 wherein the selected graphic image is formatted as Graphics Interchange Format (GIF) computer file.

5. The system as set forth in claim 1 wherein the supplier includes a database having a list of clients each defined as a plurality of entities and wherein each of the entities includes at least one profile associated with the respective of the entities and wherein each profile includes a plurality of graphic files associated with the respective profile.

6. The system as set forth in claim 5 wherein the supplier includes means for converting a graphical design received from the client into one of the plurality of graphic files associated with a predetermined profile and a predetermined entity in the database.

7. The system as set forth in claim 6 wherein the client includes a client computer having an Internet browser application therein and wherein the supplier is interconnected with the client computer through an Internet connection wherein data is transferred between the database and the client computer at least in part over the Internet connection.

8. A method for enabling customization of viewed articles available from a supplier on a client display screen located remote from the supplier at a client, comprising:

storing, on a database at the supplier, at least one profile of the client, the profile including a plurality of graphic images associated with the client;

storing, at the supplier, a plurality of images representative of articles associated with the supplier;

displaying, at the client, an article image from one of the plurality of images representative of the articles and a menu that includes the plurality of graphic images associated with the client; and manipulating, by the client, a selected graphic image of the plurality of graphic images to a predetermined location that is overlaid on the article image and for fixing the selected graphic image associated with the client at a redetermined location on the article image, wherein the selected graphic image is substantially free of external boundaries so that areas not defined by the selected graphic image appear as a portion of the article image lying thereunder.

9. The method as set forth in claim 8 further comprising establishing a computer network interconnecting a respective computer of each of the client and the supplier, and electronically transmitting, over the computer network, between the supplier and the client display screen.

10. The method as set forth in claim 9 further comprising transmitting a combination of the selected graphic image and the article image in a predetermined orientation to the supplier computer over the network from the client computer and storing the image at the combined supplier computer for further processing.

11. The method as set forth in claim 10 further comprising formatting the selected graphic image as Graphics Interchange Format (GIF) computer file.

12. The method as set forth in claim 8 further comprising defining in the supplier a database having a list of clients each defined as a plurality of entities and wherein each of the entities includes at least one profile associated with the respective of the entities and wherein each profile includes a plurality of graphic files associated with the respective profile.

13. The method as set forth in claim 12 further comprising converting a graphical design received from the client into one of the plurality of graphics associated with a predetermined profile and a predetermined entity in the database.

14. The method as set forth in claim 13 further comprising establishing an Internet connection between the supplier and a client computer having an Internet browser application therein and transferring data between the database and the client computer at least in part over the Internet connection.

15. The method as set for in claim 14 further comprising submitting, by the client, image data representative of the article image with the selected graphic image fixed in a predetermined location thereon to the database over the Internet connection to the supplier and storing the image data in association with the client.

16. The method as set forth in claim 15 further comprising reading, by the supplier, of the image data, and producing a physical version of the article based upon the data.

17. The method as set forth in claim 12 further comprising logging into the supplier database by entering a predetermined identification indicative of a given profile entry in the database.

18. The method as set forth in claim 17 further comprising assigning, by the supplier, to an entity entry in the database representative of the client and receiving from the client a plurality of graphic images and storing, by the supplier, of the graphic images in an images file in the database in association with the profile and the entity entry in the database.

* * * * *